June 6, 1939.  D. R. SWINGLE  2,161,107
CONTAINER STRUCTURE
Filed Dec. 3, 1937
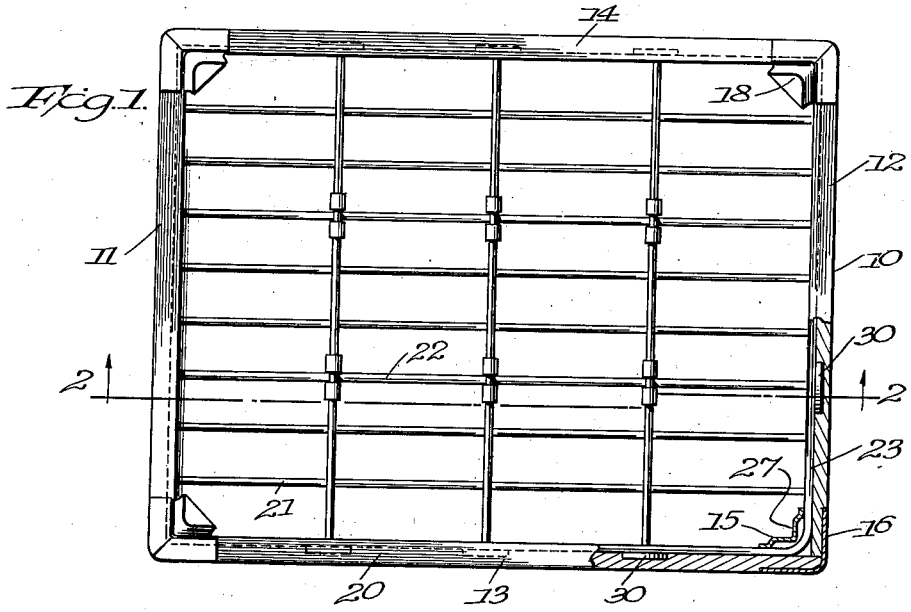
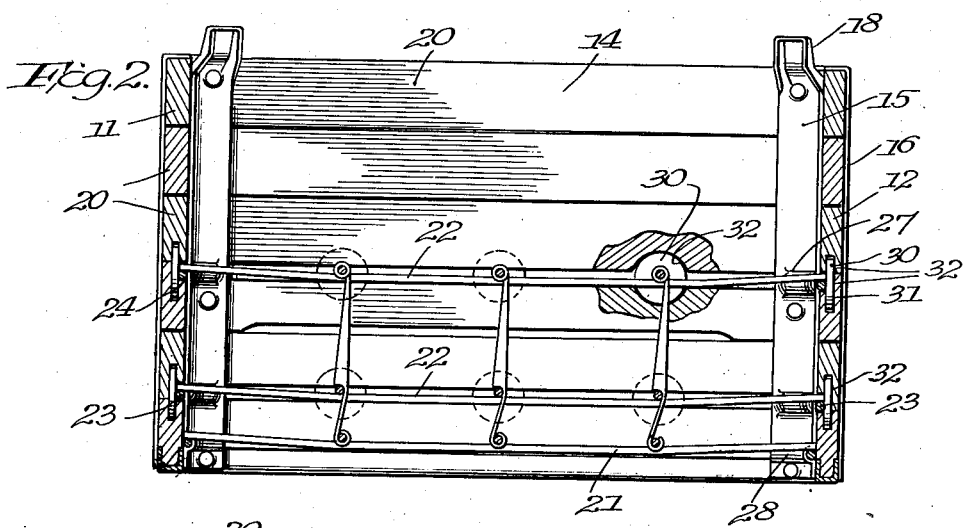
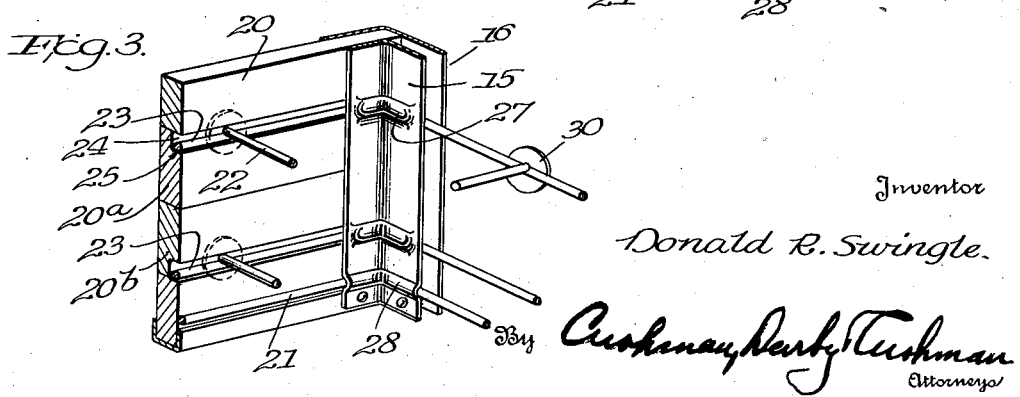
Inventor
Donald R. Swingle.
By Cushman, Darby & Cushman
Attorneys Patented June 6, 1939

2,161,107

UNITED STATES PATENT OFFICE 2,161,107

CONTAINER STRUCTURE

Donald R. Swingle, Chattanooga, Tenn., assignor to Cumberland Case Co., Chattanooga, Tenn., a corporation of Tennessee Application December 3, 1937, Serial No. 177,984

2 Claims. (Cl. 217—19)

The present invention relates to a container structure and, more particularly, to a structure for bracing and reinforcing crates and other containers.

The invention is herein shown and described applied to a milk bottle crate, but it will be understood that the invention is applicable to containers of various types.

An important object of the invention is to provide a bracing structure for containers.

In various types of boxes and other containers, including crates such as are used for holding milk bottles, the walls of the crate may become bent either inwardly or outwardly during handling. In a milk bottle crate, inward bending of the walls can be prevented to some extent by providing a strong bottle spacing grid structure within the crate. However, such a grid will not counteract outward bending or bulging of the walls.

The present invention, when applied to a milk bottle crate, involves the positioning in the crate of means to connect together the walls of the crate so that they will be held against either inward or outward bending, such means ordinarily being included in the bottle spacing grid structure.

Another object of the invention is to provide an article spacing grid for use in a box, and which grid will be of maximum strength.

A further object of the invention is to provide a grid supporting structure giving an optimum degree of security, and which also increases the useful space within the crate.

Other objects and advantages of the invention will be apparent from the following specification and drawing, wherein:

Figure 1 is a plan view of a milk bottle crate including the structure of the present invention, a portion of the view being in horizontal section.

Figure 2 is a vertical sectional view on the line 2—2 of Figure 1, and

Figure 3 is a fragmentary and perspective view of a portion of a crate constructed in accordance with the invention.

The numeral 10 generally designates a milk bottle crate including the structure of the present invention, the crate including end walls 11 and 12 and side walls 13 and 14, the walls being joined at their ends by the usual inside and outside corner bracing elements 15 and 16, respectively. The inside corner bracing members may include stacking irons 18 at their upper ends, as best shown in Figures 1 and 2.

The walls of the crate 10 are formed of slats 20 of wood or other suitable material, and which slats are secured together in the usual edge to edge arrangement by the corner braces. The crate includes a bottle supporting grid 21 formed of closely spaced crossed wires, this grid being supported near the bottom of the crate in the manner hereinafter described. Bottle spacing grids 22 are positioned one above the other and above the bottle supporting grid 21 in the usual manner. As is also customary, the spacing of the wires forming the bottle spacing grids is greater than that of the wires forming the bottle supporting grid 21.

The bounding wires 23 defining the outer edges of the bottle spacing grids 22 are seated in recesses 24 in the inner surfaces of the walls of the crate. For example, in the present embodiment of the invention, the bounding wire 23 of the upper bottle spacing grid 22 is seated on a shoulder 25 formed by cutting away the upper and inner edge of the slat 20a of one of the tier of slats extending about the crate. The lower bottle spacing grid 22 has its bounding wire 23 positioned on the upper edge of the bottom tier of slats, and the slats of the tier 20b immediately above have their inner and lower edges cut away to receive the bounding wire. It will be noted that the recesses 24 are of sufficient depth to receive the ends of the cross-wires of the grids, which wires are secured to either the upper or lower surfaces of the bounding wires.

As best shown in Figures 1 and 2, the inner corner braces 15 are grooved as indicated at 27 to permit the bounding wires 23 to extend behind the same. The bottle supporting grid 21 is primarily supported in grooves 28 formed adjacent the lower ends of the inner corner braces 15.

In order to brace the intermediate portions of the walls of the crate and thereby strengthen the entire structure, disks or headers 30 of planar form are spaced along the bounding wires 23 of the bottle spacing grids 22, each header preferably being welded to a bounding wire at the point at which a cross wire joins the latter. The headers 30 are positioned in pockets 31 in the walls of the crate, the pockets being formed by oppositely facing, semi-cylindrical slots 32 provided in the opposing or facing edges of adjacent slats 20. As best shown in Figure 2, the slots 32 are spaced from the inner and outer faces of the slats, and by this arrangement, the bounding wire 23 of the grid will lie in a recess 25 opening to the inner wall surface of the crate, while the headers 30, which form enlargements of the edge of the grids, are entirely enclosed in the body of the crate wall. This construction will obviously prevent the crate wall from being forced either inwardly or outwardly.

It will be understood that it is not necessary to provide a header 30 at the end of each cross wire of the bottle spacing grids 22, in most instances but one header being necessary on each side of a grid, or perhaps headers need only be provided in the middle of the longer walls of the crate. On the other hand, if extreme bracing is desired, a crate may be further strengthened by providing headers 30 on the bounding wire of the bottle supporting grid 21, as well as upon one or both of the bottle spacing grids.

In some instances, the bounding wire 23 may be omitted, and the headers 30 may be secured to the ends of the cross-wires of the grid. A box structure not provided with a grid may of course be braced by a suitably positioned wire provided with discs and extending across the same.

By the structures heretofore described, a crate, box or other container may have its walls braced by a member which is firmly locked to the walls. Nevertheless, the bracing arrangement does not detract from the useful space within the crate, nor unduly increase the cost of manufacture. On this latter point, it is to be noted that the crates can be assembled in exactly the same way as present day crates, and that, after assembly, no special operations need be performed upon the crate for the purpose of securing the bracing members in place.

I claim:

1. The combination in a box-like structure having walls including slat members, of an article-engaging grid formed of crossed wires, planar elements rigidly secured to the opposite ends of said wires to prevent inward and outward movement of the walls, the opposed edges of adjacent slats being provided with pockets opening to such edges and adapted to cooperate to enclose each planar element, the pockets being spaced inwardly from each exterior surface of the slat members to brace the planar elements and wires against all longitudinal movement.

2. The combination in a box-like structure including side and end walls formed of slat members, of an article-engaging grid including a bounding member encircling its perimeter, planar elements rigidly secured to and spaced along the bounding member and extending substantially perpendicular to the plane of the grid, one row of slat members of the side and end walls having an inner edge grooved to receive the bounding member of the grid, said row of slat members and the row of slat members adjacent the grooved edge thereof having aligned pockets in their opposite horizontal edges adjacent the grooves adapted to cooperate to enclose the planar elements, the pockets being spaced inwardly from each exterior surface of the slat members to hold the grid rigid with the walls.

DONALD R. SWINGLE.